March 29, 1932.  F. FIEDERLEIN  1,851,574
PIPE JOINT OR COUPLING
Filed Sept. 9, 1929  2 Sheets-Sheet 1

INVENTOR
Fred Fiederlein
BY
ATTORNEY

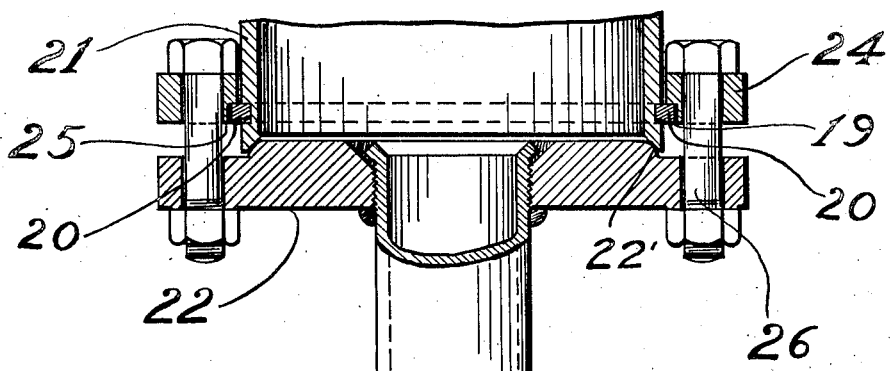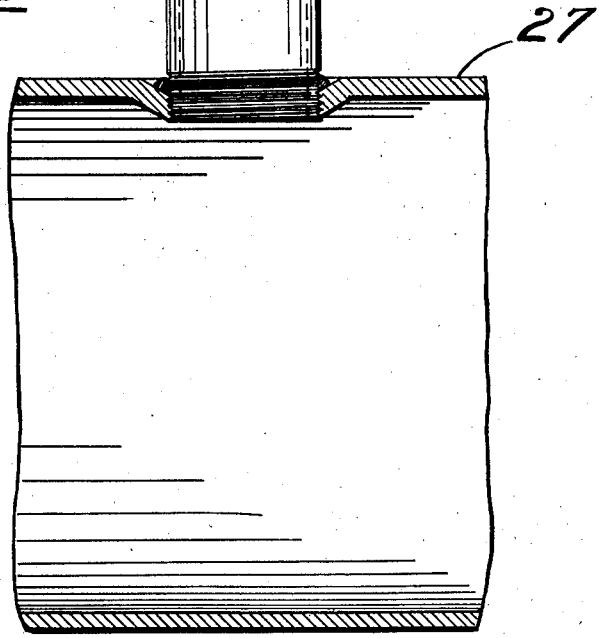

Patented Mar. 29, 1932

1,851,574

UNITED STATES PATENT OFFICE

FRED FIEDERLEIN, OF ELIZABETH, NEW JERSEY

PIPE JOINT OR COUPLING

Application filed September 9, 1929. Serial No. 391,303.

This invention relates to improvements in pipe couplings, header box or manifold connections, and the like. The principal object of the invention is to provide readily removable connecting and packing retaining devices. In a preferred form these comprise one or more rings seated in grooves in the pipes or the like to be connected, and rigid as against transverse stresses. The rings are capable of being sprung out of engagement with the pipes when the assembly is to be taken down. There are no projections to interfere with the removal of the pipes.

The invention will be fully understood from the following description, read in connection with the accompanying drawings, in which Fig. 1 is a vertical section through one form of the device;

Fig. 4 is a vertical section through an alternative form of the invention.

Figure 1:
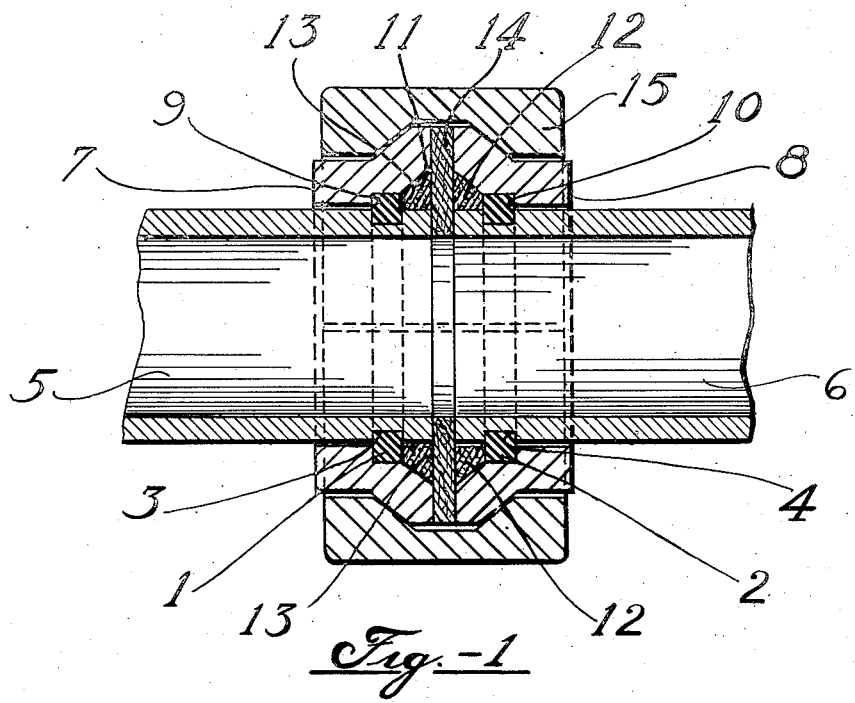
Figure 2:
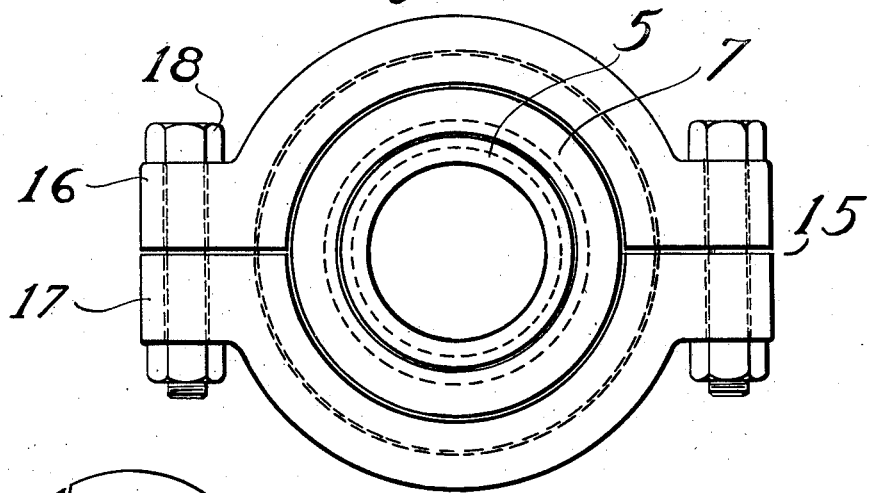
Fig. 2 is an end elevation of the same.
Figure 3:
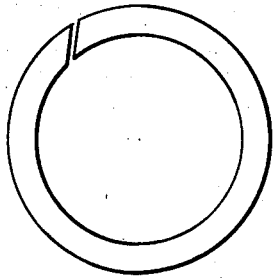
Fig. 3 is a detailed view of a split ring.

Referring first to Figs. 1, 2 and 3, reference numerals 1 and 2 denote split rings of cast iron, steel or other suitable material. These rings are seated in annular grooves 3 and 4 formed near the ends of the pipe sections 5 and 6 which are to be connected. Housings 7 and 8 encircle the rings, and have shoulders 9 and 10 to receive them. The housings are preferably inclined away from the pipe so as to form recesses 11 and 12 for packing 13. A packing ring 14 is placed between the abutting ends of the pipes and housings.

The assembly is held together by a clamp 15, preferably made in two half sections having matched flanges 16 and 17 secured together by bolts 18.

In the form of the invention shown in Fig. 4, a resilient metal ring 19 is partly seated in a groove 20 near the end of a furnace tube 21. This tube is closed by a plate 22 constituting a flange which is perforated to receive a pipe 23 of smaller diameter than tube 21. Plate 22 is provided with a beveled shoulder 22' and the end of tube 21 is beveled to engage the shoulder. A collar 24 having a shoulder 25 is adapted to fit over the ring 19 and engage the side of the ring opposed to the end of the tube. The collar and plate are perforated to receive bolts 26 by which these parts may be drawn together. Pipe 23 is connected to a manifold 27, which may receive a large number of similar pipes in an oil cracking or hydrogenation unit, or the like.

It will be observed that the split rings used in this invention can not become dislodged from the pipe since they are held by the shoulders on the housings which surround them. The connection is adapted for use in high pressure equipment. The rings are rigid with respect to direct shearing stresses and provide a very strong union between the abutting pipe sections.

It will be understood that the foregoing description is merely illustrative and that various changes and alternative arrangements may be made within the scope of the appended claim.

I claim:

A pipe coupling, comprising opposed pipe sections, a flange projecting radially outwardly from one of the sections, the flange having a beveled shoulder, the second pipe section having a beveled portion adapted to be seated against the shoulder and having an exterior annular recess, a ring disposed in the recess and projecting beyond the periphery of the pipe section, a collar encircling the second pipe section and having a shoulder engaging the side of the projecting ring opposed to the pipe section end, and means associated with the flange and collar to seat the beveled shoulder against the beveled portion.

FRED FIEDERLEIN.